(12) United States Patent
Schroeder et al.

(10) Patent No.: US 9,109,531 B2
(45) Date of Patent: Aug. 18, 2015

(54) METHOD FOR TESTING CASTING QUALITY AND APPARATUS THEREFOR

(75) Inventors: Karl Schroeder, Columbus Grove, OH (US); Richard H. Snyder, II, Chillicothe, OH (US); Brad Heitkamp, Minster, OH (US); Donald Rethman, Jackson Center, OH (US); Gregory Staley, Bluffton, OH (US); Joseph Timmerman, Fort Recovery, OH (US)

(73) Assignee: Honda Motor Co., Ltd., Tokyo (JP)

( * ) Notice: Subject to any disclaimer, the term of this patent is extended or adjusted under 35 U.S.C. 154(b) by 893 days.

(21) Appl. No.: 13/345,821

(22) Filed: Jan. 9, 2012

(65) Prior Publication Data

US 2013/0176420 A1   Jul. 11, 2013

(51) Int. Cl.
*B22D 46/00* (2006.01)
*F02F 1/24* (2006.01)
*H04N 7/18* (2006.01)

(52) U.S. Cl.
CPC *F02F 1/24* (2013.01); *H04N 7/183* (2013.01); *F02F 2200/06* (2013.01)

(58) Field of Classification Search
CPC ....................................................... B22D 46/00

USPC ................................................. 164/4.1, 456
See application file for complete search history.

(56) References Cited

U.S. PATENT DOCUMENTS

| 4,620,586 | A | * | 11/1986 | Musschoot | 164/253 |
|---|---|---|---|---|---|
| 4,821,654 | A | * | 4/1989 | Becker et al. | 110/236 |
| 5,460,219 | A | | 10/1995 | Massin et al. | |
| 5,697,424 | A | | 12/1997 | Ferdinandsen et al. | |
| 5,957,188 | A | | 9/1999 | Crafton | |
| 6,056,042 | A | | 5/2000 | Matsui et al. | |
| 6,644,382 | B1 | | 11/2003 | Aoyama et al. | |
| 7,509,994 | B2 | * | 3/2009 | Aoyama et al. | 164/404 |
| 8,186,419 | B2 | * | 5/2012 | Newcomb | 164/132 |
| 2008/0011446 | A1 | | 1/2008 | Crafton et al. | |

* cited by examiner

*Primary Examiner* — Kevin P Kerns
(74) *Attorney, Agent, or Firm* — Rankin, Hill & Clark LLP

(57) ABSTRACT

A method for testing casting quality includes collecting sand that has fallen from an internal cavity of the casting at a collection area. The collection area includes a screen and a pad. The method further includes capturing a first image of sand that has fallen onto the pad and analyzing the first image to determine an amount of black sand that has fallen onto the pad. The method further includes capturing a second image of sand that has been retained on the screen and analyzing the second image to determine an amount of black sand chunks retained on the screen.

8 Claims, 4 Drawing Sheets

METHOD FOR TESTING CASTING QUALITY AND APPARATUS THEREFOR

BACKGROUND

During the casting process of a cylinder head, for example, a sand core is placed in a die to form intricate passages required of the specific casted piece. After producing the casting, the sand is removed from the internal cavities of the casting. Current methods to verify the internal condition of sand remaining in the casting include manually striking the casting and making a judgment based on quantity, color and conditions of the sand that falls from the casting. The current method is based on operator evaluation and can be prone to human mistakes and varying interpretations of standards.

SUMMARY

An example of a method for testing casting quality that can overcome at least one of the aforementioned shortcomings includes collecting sand that has fallen from an internal cavity of the casting at a collection area. The collection area includes a screen and a pad. The method further includes capturing a first image of sand that has fallen onto the pad and analyzing the first image to determine an amount of black sand that has fallen onto the pad. The method further includes capturing a second image of sand that has been retained on the screen and analyzing the second image to determine an amount of black sand chunks retained on the screen.

An example of a black sand check machine includes a stand for supporting a casting, a hammer positioned with respect to the stand for striking the casting to dislodge sand from the casting, a collection area below the casting supported by the stand for collecting sand dislodged from the casting, and a camera positioned with respect to the collection area for capturing images of sand that has fallen from the casting. The collection area includes a screen and a pad. The camera is positioned for capturing images of sand that has fallen from the casting onto at least one of the screen and the pad.

Another method for testing casting quality includes providing a sand sample from a casting on a screen supported by an underlying surface; capturing a first image of the sand sample on the underlying surface; analyzing the first image for black sand coverage; removing the underlying surface; capturing a second image of the sand sample retained on the screen; and analyzing the second image for black sand coverage.

DETAILED DESCRIPTION

Figure 1:
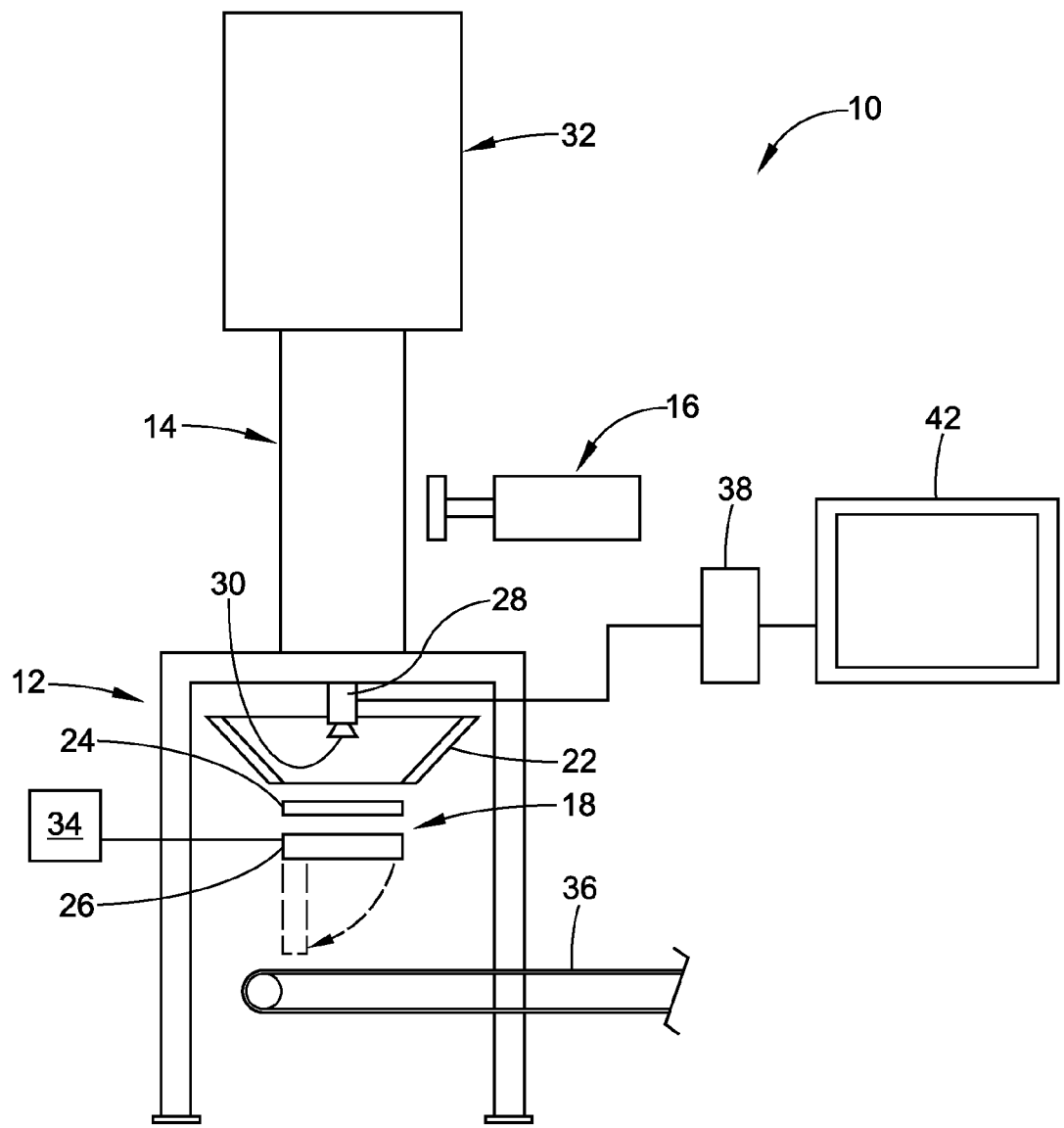
FIG. 1 is a schematic depiction of a black sand check machine.

FIG. 1 schematically shows a black sand check machine 10. The black sand check machine 10 includes a stand 12 for supporting a casting 14. The casting 14 can be an engine cylinder head and will be described as such below. Nevertheless, the black sand check machine 10 can be used with other castings. The black sand check machine 10 also includes a hammer 16 positioned with respect to the stand 12 for striking the cylinder head 14 to dislodge sand from the cylinder head. The black sand check machine 10 also includes a collection area 18 below the cylinder head 14 supported by the stand 12. The collection area 18 is for collecting sand dislodged from the cylinder head. In the illustrated embodiment, the collection area 18 includes a funnel 22, a screen 24, and a pad 26. The black sand check machine 10 further includes a camera 28 positioned with respect to the collection area 18 for capturing images of sand that has fallen from the cylinder head onto at least one of the screen 24 and the pad 26.

The stand 12, which supports the cylinder head 14 (or other casting), can be made from a metal frame having an opening that allows sand that has fallen from the cylinder head 14 to fall towards the collection area 18. A gripper 32 can also support the cylinder head 14 and be used to move the cylinder head to the stand 12 and to carry the cylinder head 14 away from the stand. The gripper 32 and the stand 12 minimize the physical handling of the cylinder head 14 by an operator who is to check the casting quality. In the illustrated embodiment, the cylinder head 14 is positioned in a vertical position with respect to the stand 12 with a large water port of the cylinder head 14 pointing downward, i.e., towards the collection area 18. The cylinder cavities (not depicted in FIG. 1), which receive the engine pistons, are horizontally oriented. This allows for proper alignment of the cylinder head 14 with respect to the hammer 16.

The hammer 16 can be hydraulically or pneumatically actuated. The force applied by the hammer 16 onto the cylinder head 14 can approximate the force of a 16-ounce hammer swung by a line worker. An example of such a force is between about 10 lbf and about 20 lbf. Even though only one hammer 16 is shown, multiple hammers can be provided. The cylinder head 14 can be struck in multiple locations on the cylinder head 14 using the multiple hammers. The cylinder head 14 can also be struck a single instance or multiple times. The force at which the hammer 16 contacts the cylinder head 14 is chosen to be a great enough force enough to dislodge any black sand that might be stuck within the internal passages of the cylinder head 14 without cracking the cylinder head 14.

The collection area 18 is positioned below the cylinder head 14 supported by the stand 12 and is for collecting sand dislodged from the cylinder head 14. The collection area 18 includes the funnel 22, which is disposed above the screen 24 and the pad 26. The funnel 22 directs the sand that has fallen from the cylinder head 14 toward the screen 24 and the pad 26. The screen 24 is disposed above the pad 26 in the illustrated embodiment. The screen 24 can be a wire mesh screen having two millimeter openings (apertures) and a wire diameter of 2 mm. The size of the openings can be dependent upon the casting that is being checked with the black sand check machine 10. The pad 26, which is disposed underneath the screen 24, can be a white flat (planar) pad. By making the pad 26 white in color, black sand will register in images captured by the camera 28 of the white pad while white sand can be ignored. An actuator 34 can be provided to move the pad 26. For example, the actuator 34 can allow the pad 26 to pivot such that sand that has fallen onto the pad can drop onto a conveyor 36 to be taken away from the black sand check machine 10.

The camera 28 is schematically depicted as positioned with respect to the collection area 18 for capturing images of sand that has fallen from the cylinder head 14 onto at least one of the screen 24 and the pad 26. The camera 24 can be similar to industrial CCD/CMOS sensor type cameras and include a lens with a built-in LED ring light, which can emit light of the desired color for the application (for example, red, blue or white). The camera 28 includes a lens 30, which can be situated directly above the screen 24 and/or the pad 26. The screen 24 can rest on and/or be supported by the pad 26. The camera 28 can be set at an exposure to wash out the screen 24 when capturing images of sand that has fallen from the cylinder head 14.

The black sand check machine 10 further includes a processor 38 in electrical communication with the camera 28. The processor 38 is configured to process images captured by the camera 28 and can also communicate with a display 42 to display the captured images. The camera 28, the processor 38, and the display 42 can be provided to analyze images to determine the quality of the casting of the cylinder head 14 in a manner that will be described in further detail below.

A method for testing quality of a casting will be described with reference to FIGS. 1 and 2. Even though the method will be described with reference to the black sand check machine 10 depicted in FIG. 1, the method can be used with other machines capable of carrying out the steps described with reference to FIG. 2. Moreover, even though FIG. 2 depicts the steps in a logical order, the method for testing quality of a casting is not limited to the order depicted in FIG. 2.

Figure 2:
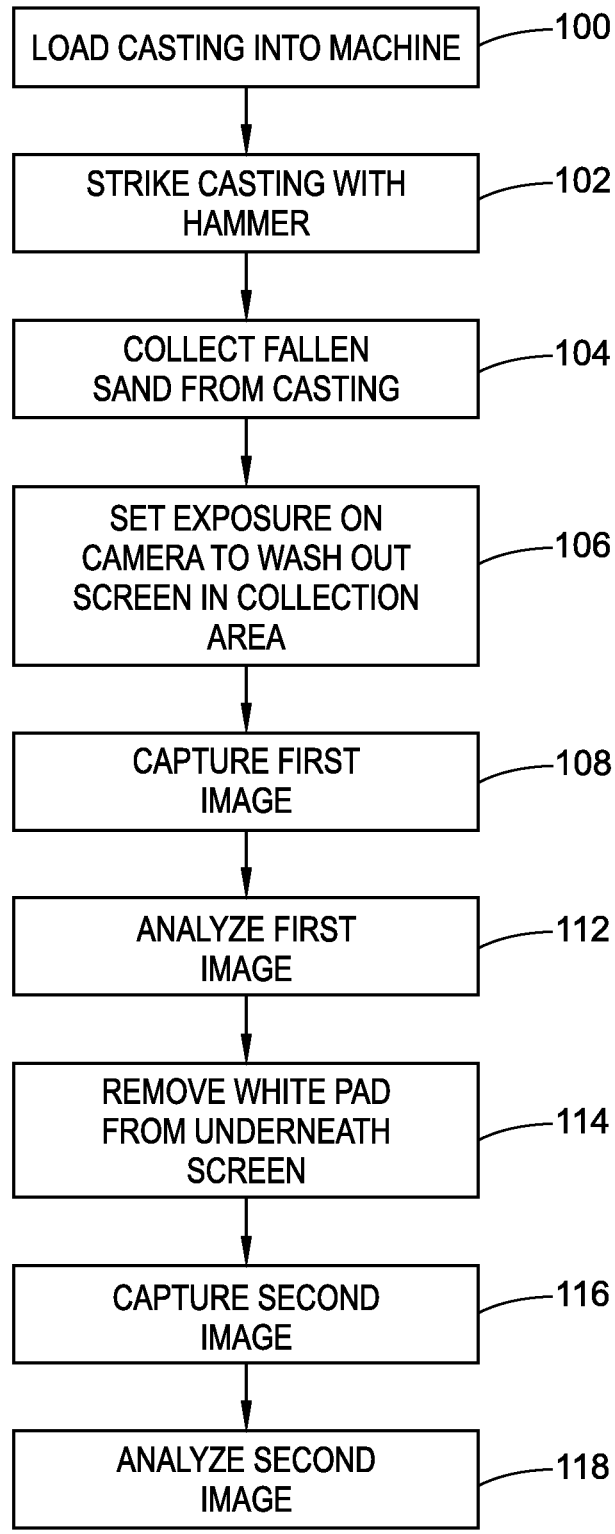
FIG. 2 is a flow diagram depicting a method for testing casting quality.

With reference to FIG. 2, at 100, a casting, such as the cylinder head 14 in FIG. 1, is loaded into or onto the black sand check machine 10. As mentioned above, the cylinder head 14 can be positioned in the vertical position with the large water port pointing down. At 102, the cylinder head 14 is struck with the hammer 16. Two different gates, or locations, on the cylinder head 14 can be struck hard enough without cracking the cylinder head 14 to knock loose any black sand that might be stuck within the internal cavities passages of the cylinder head 14. The force at which the hammer 16 strikes the cylinder head 14 can be a prescribed number of times at a prescribed force.

Sand that is knocked loose falls into the funnel 22 and is collected, at 104, for evaluation. The sand that is collected has fallen from internal cavities of the cylinder head 14 and is collected at the collection area 18. As mentioned above, the collection area 18 can include the funnel 22, the screen 24, and the pad 26. Collecting fallen sand from the cylinder head 14 can also be referred to as providing a sand sample from a casting on a screen, such as the screen 24, supported by an underlying surface, such as the pad 26.

The method for testing quality of a casting further includes setting the exposure on the camera 28 to wash out the screen 24, more particularly the wires of the screen, in the collection area 18. In other words, at 106, the exposure of the camera 28 is set such that the images captured by the camera do not include the individual wires that make up the screen 26 in any images where the screen 24 has been washed out. Since the captured image does not include the wires that make up the screen 24, this allows for a more accurate depiction of black sand that has fallen from the cylinder head 14 onto the white pad 26.

Figure 3:
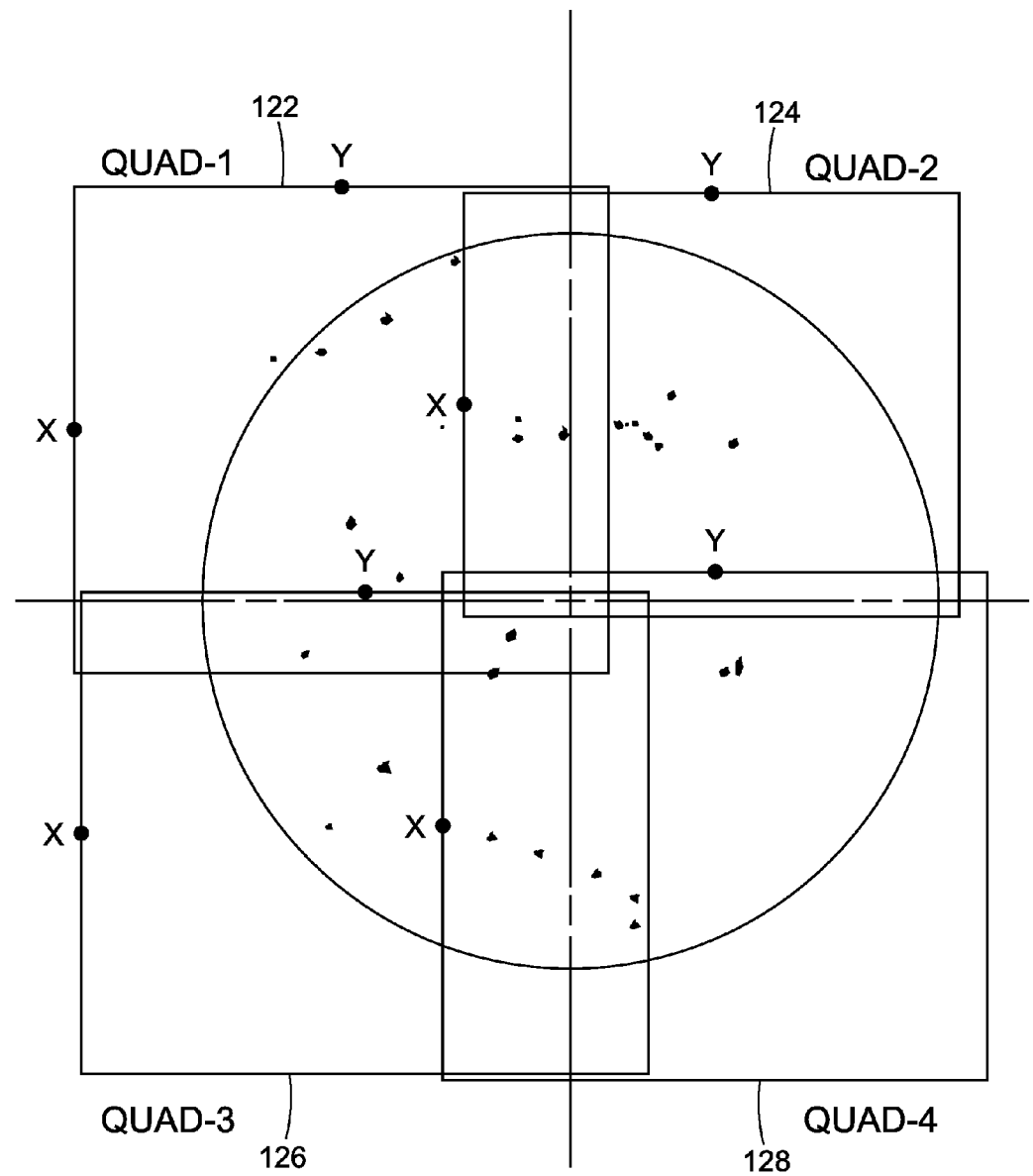
FIG. 3 depicts a captured image of sand that has fallen from a casting onto a pad or underlying surface.

The camera 28 then captures a first image at 108. The first image is used to evaluate the amount of black sand present in the collected sand sample. Since the exposure has been set to wash out the screen 24, which is disposed above the white pad 26, the black sand registers in the first image captured at 108 while white sand is ignored. An example of such a first image is shown in FIG. 3.

After capturing the first image at 108, the first image is then analyzed at 112. With reference to FIG. 3, the first image can be divided into four quadrants: 122, 124, 126 and 128. The processor 38 can include a histogram tool, which can be found in software stored on the processor 38 or the hardware of the processor 38, used to measure grayscale in each of the four quadrants 122, 124, 126, 128. The quadrants 122, 124, 126 and 128 can overlap, such as that shown in FIG. 3. The processor 38 can include software and/or hardware that is programmed to judge between white sand and black sand based on a value of average grayscale and/or a dark count value. As such, analyzing the first image can include determining a dark count value for a quadrant of the first image and comparing the determined dark count value to a predetermined dark count value. If the determined dark count value is greater than the predetermined dark count value, then the amount of black sand that has fallen onto the white pad 26 is too great and the casting quality can be determined as no good (N/G). If, however, the determined dark count value is less than the predetermined dark count value in the first image, then the judgment can be OK and the casting has passed the quality examination. Alternatively, and/or in combination with the aforementioned dark count value, analyzing the first image can include determining an average grayscale for each quadrant for the first image and comparing the determined average grayscale value to a predetermined grayscale value. Where the determined average grayscale value is greater than the predetermined grayscale value, the casting quality can be determined as N/G. Where the determined average grayscale value is less than the predetermined grayscale value, the casting quality can be determined as OK and the casting has passed the quality examination.

With reference back to FIG. 2, the method for determining quality of a casting can further include removing the pad 26 from underneath the screen 24, at 114. The white backdrop provided by the white pad 26 drops away allowing loose sand to fall away onto the conveyor 36 while larger "chunks" of sand remain on the screen 26. These black sand chunks are larger than the apertures of the screen 24, which in the illustrated embodiment is two millimeters. The size of the black sand chunks is dependent on the size of the apertures on the screen 24.

Figure 4:
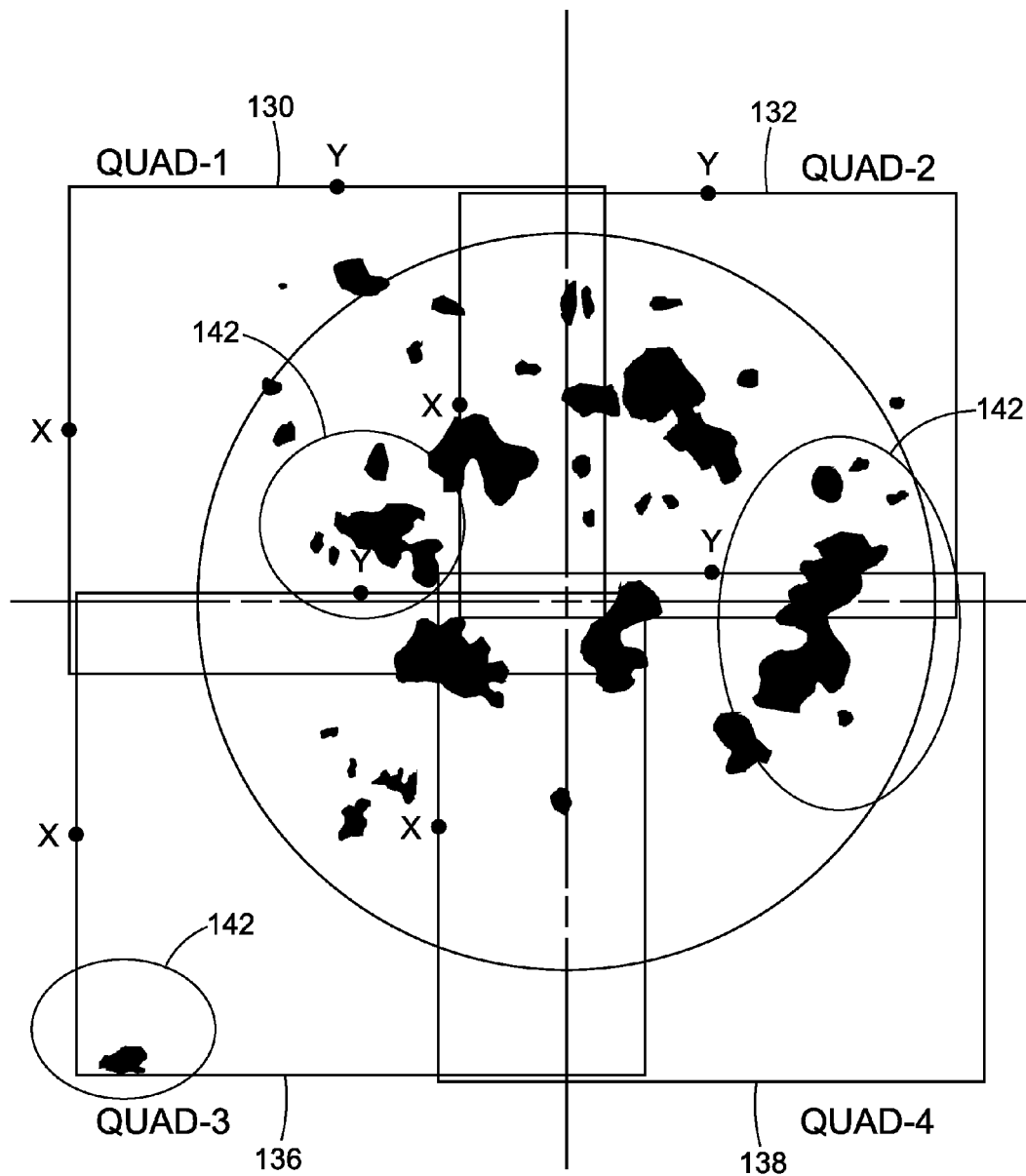
FIG. 4 depicts an image of sand that has fallen onto a screen.

The method further includes capturing a second image of the screen 26 at 116. An example of such a second image is shown in FIG. 4. The same camera 28 used to capture the first image, at 108, can be used to capture the second image, at 114. The captured second image can be sent to the processor 38. An example of such a second image is shown in FIG. 4.

The second image is then analyzed at 118. Analyzing the second image can include measuring a number of black sand chunks retained on the screen 24. With reference to FIG. 4, the second image can be divided into four quadrants: 130, 132, 136 and 138. FIG. 4 schematically depicts the use of a blob tool, which can be found as hardware and/or software on the processor 38. The blob tool finds blob areas larger than two millimeters, which is the size of the openings in the screen 24. These are shown surrounded by ovals 142 in FIG. 4. Where the black sand chunks are found in the second image having a diameter larger than two millimeters, the casting judgment can be N/G. Where no black sand chunks larger than two millimeters (or the size of the apertures where a different screen is used) are found in the second image, then the casting judgment can be OK.

A method for testing quality of a casting and a black sand check machine have been described above with particularity. Modifications and alterations will occur to those upon reading and understanding the preceding detailed description. The invention, however, is not limited to only the embodiments described above. Instead, the invention is broadly defined by the appended claims and the equivalents thereof. Also, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for testing quality of a casting, the method comprising:
   collecting sand that has fallen from an internal cavity of the casting at a collection area, wherein the collection area includes a screen and a pad;
   capturing a first image of sand that has fallen onto the pad;
   analyzing the first image to determine an amount of black sand that has fallen onto the pad;
   capturing a second image of sand that has been retained on the screen; and
   analyzing the second image to determine an amount of black sand chunks retained on the screen.

2. The method of claim 1, wherein the screen is disposed above the pad at the collection area.

3. The method of claim 2, further comprising setting an exposure of a camera to wash out the screen from the first image, wherein capturing the first image further includes capturing the first image with the camera.

4. The method of claim 3, wherein analyzing the first image further includes determining a dark count value for the first image and comparing the determined dark count value to a predetermined dark count value.

5. The method of claim 3, wherein analyzing the first image further includes determining an average gray scale value for the first image and comparing the determined average gray scale value to a predetermined gray scale value.

6. The method of claim 2, further comprising removing the pad from underneath the screen, wherein capturing the second image further includes capturing the second image after the pad has been removed from underneath the screen.

7. The method of claim 6, wherein analyzing the second image includes measuring a number of black sand chunks retained on the screen, wherein the black sand chunks measure greater than an aperture size for the screen.

8. The method of claim 1, further comprising striking the casting with a hydraulically actuated or a pneumatically actuated hammer.

* * * * *